United States Patent
Fan et al.

(10) Patent No.: US 7,292,710 B2
(45) Date of Patent: Nov. 6, 2007

(54) SYSTEM FOR RECORDING IMAGE DATA FROM A SET OF SHEETS HAVING SIMILAR GRAPHIC ELEMENTS

(75) Inventors: Zhigang Fan, Webster, NY (US); Ramesh Nagarajan, Pittsford, NY (US); Yingjun Bai, Webster, NY (US)

(73) Assignee: Xerox Corporation, Stamford, CT (US)

( * ) Notice: Subject to any disclaimer, the term of this patent is extended or adjusted under 35 U.S.C. 154(b) by 744 days.

(21) Appl. No.: 10/788,944

(22) Filed: Feb. 26, 2004

(65) Prior Publication Data

US 2005/0190981 A1 Sep. 1, 2005

(51) Int. Cl.
*G06K 9/00* (2006.01)
(52) U.S. Cl. ...................... 382/103; 382/243
(58) Field of Classification Search ................ 382/103, 382/117, 180, 218, 224, 243, 257, 14, 192, 382/194, 195, 203, 205, 234, 7
See application file for complete search history.

(56) References Cited

U.S. PATENT DOCUMENTS

| 5,539,841 A | * | 7/1996 | Huttenlocher et al. ...... 382/218 |
| 6,044,375 A | * | 3/2000 | Shmueli et al. ............. 707/101 |
| 7,020,335 B1 | * | 3/2006 | Abousleman ............... 382/199 |

* cited by examiner

*Primary Examiner*—Samir Ahmed
*Assistant Examiner*—Abolfazl Tabatabai
(74) *Attorney, Agent, or Firm*—R. Hutter

(57) ABSTRACT

In an input scanning system, as would be present in a digital copier, a "template" of similar visual elements or objects, such as logos and other designs, is detected among a series of scanned images. The common objects form a reference image against which subsequently-recorded input images are compared. If bounding boxes around objects in the input images match those in the reference image, the objects in the bounding boxes are attempted to be matched to those in the reference image. If objects in the input image and reference image match, then the image data from the input image is coded using a pointer to the corresponding object in the reference image.

9 Claims, 3 Drawing Sheets

SYSTEM FOR RECORDING IMAGE DATA FROM A SET OF SHEETS HAVING SIMILAR GRAPHIC ELEMENTS

TECHNICAL FIELD

The present disclosure relates to the scanning of hardcopy sheets and recording of image data thereon, as would be found, for instance, in the context of digital copiers.

BACKGROUND

The use of digital input scanners, which can successively scan a set of sheets and record the images thereon as digital data, is becoming common in the office context, such as in digital copiers and electronic archiving. In any situation in which digital image data is created and accumulated in memory and/or transmitted through communication channels, it is desirable that the memory and the communication bandwidth are used in an efficient way. In particular, it would be good to avoid filling up the memory and the communication channels with redundant data.

A common type of input scanning in an office context is scanning and recording images from forms, slide presentations, or other documents in which multiple page images share a common "template" or appearance cues, such as logos, letterheads, and so forth. In a typical slide presentation, there is a standard template slide design, including for instance a logo and a border; among the slides only the text changes. The present embodiment is directed toward a technique for efficiently recording such documents in memory.

PRIOR ART

The MPEG standard includes steps of comparing images in a series of frames, to detect visual objects, which are persistent over the series of frames.

SUMMARY

There is provided a method of recording an input image as digital data, comprising determining input bounding boxes corresponding to objects in the input image, and comparing data describing the input bounding boxes to data describing a set of reference bounding boxes. For an input bounding box sufficiently similar to a reference bounding box, objects are compared in the input bounding box and the reference bounding box. If the object in the input bounding box is sufficiently similar to the object in the reference bounding box, the object in the input bounding box is coded using a pointer to the object in the reference bounding box.

DETAILED DESCRIPTION

Figure 1:
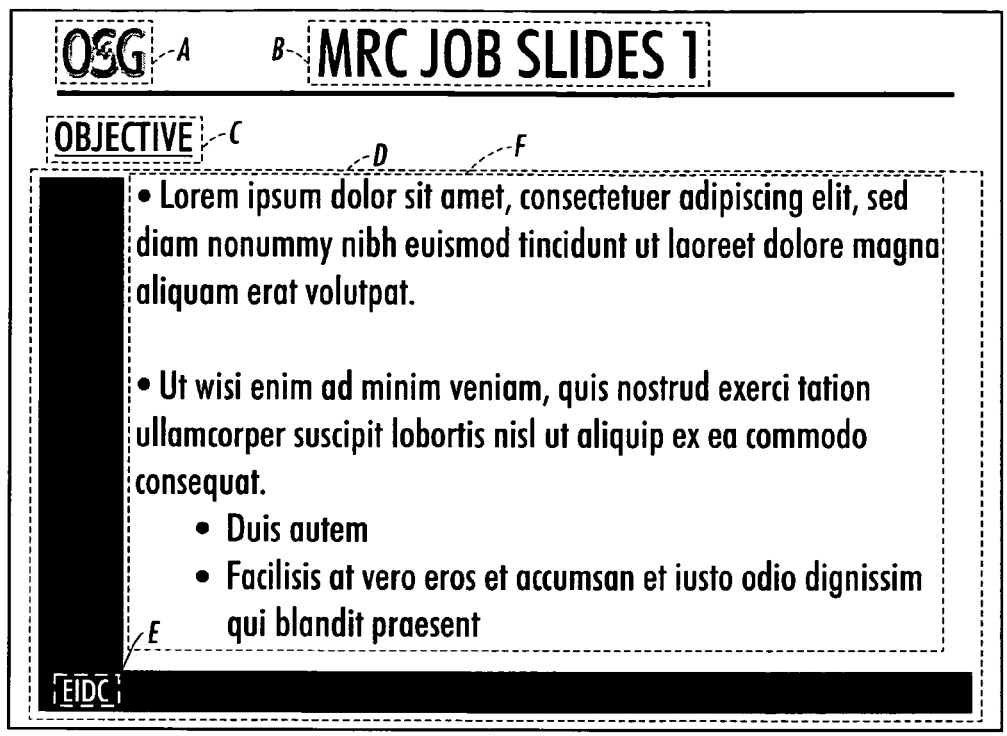
FIGS. 1 and 2 show example images to illustrate the overall operation of the embodiment.
Figure 2:
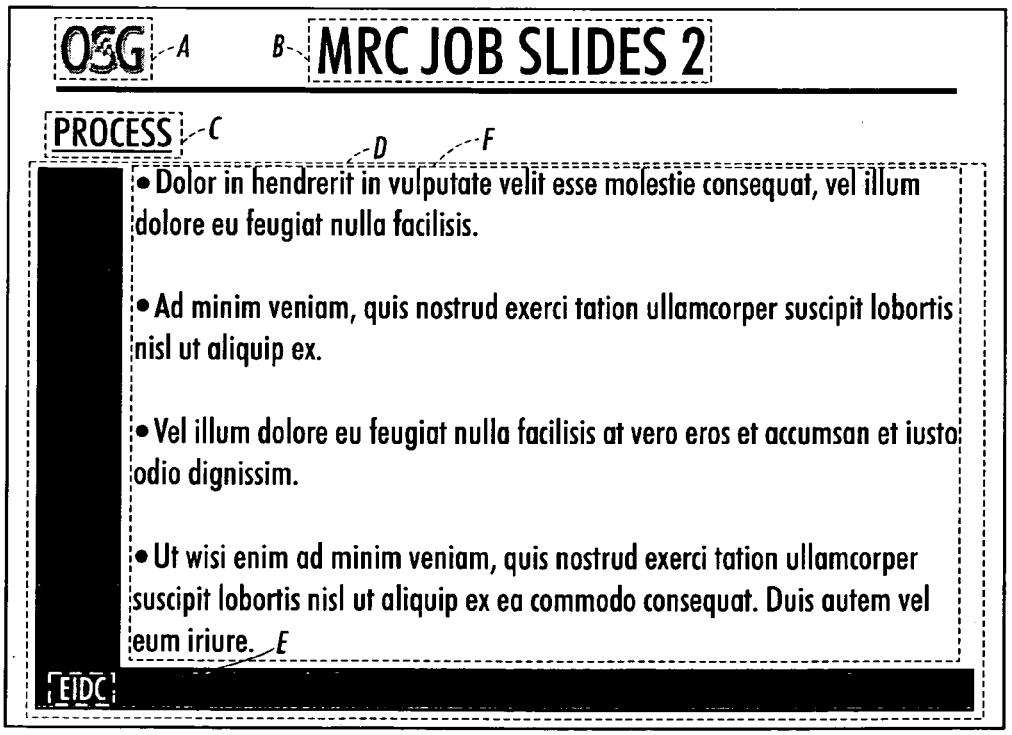

FIGS. 1 and 2 show example images to illustrate the overall operation of the embodiment. The Figures show two generally similar page images as would typically appear, for instance, as separate slides in a slide presentation. As can be seen, the slides (FIGS. 1 and 2) differ in some details, such as the text, but include numerous graphical similarities, such as in a logo and border, as well as some common text blocks. Superimposed on each slide, for purposes of the present discussion, are a number of "bounding boxes," here labeled A-F, of a general type known in image processing to isolate smaller images of a single identifiable type, called objects, within a large image. In this embodiment, a bounding box is the smallest possible rectangle (having dimensions along the x and y directions of the large image) that encompasses an object. The number of objects found in an image may vary depending on a particular segmenting technique.

Comparing the images of FIG. 1 and FIG. 2, it can be seen that many of the bounding boxes of the objects are substantially similar in terms of location, dimensions, color, type (such as text, halftone image, photograph, etc.) and other features (such as color uniformity, black/white or color). Although the general configurations of bounding boxes A-F are identical in the two Figures, the actual images within each bounding box are identical only in bounding boxes A and E, but differ within bounding boxes B, C, D, and F. Nonetheless, the fact the dimensions and types of bounding boxes in the two images are identical (or, in a practical sense, "sufficiently similar") is highly indicative that the two images share a common "template." The fact the two images in FIG. 1 and FIG. 2 are generally similar presents an opportunity to save memory, bandwidth and other resources when processing the images for any purpose, such as printing or archiving. The present embodiment identifies and exploits such opportunities.

Figure 3:
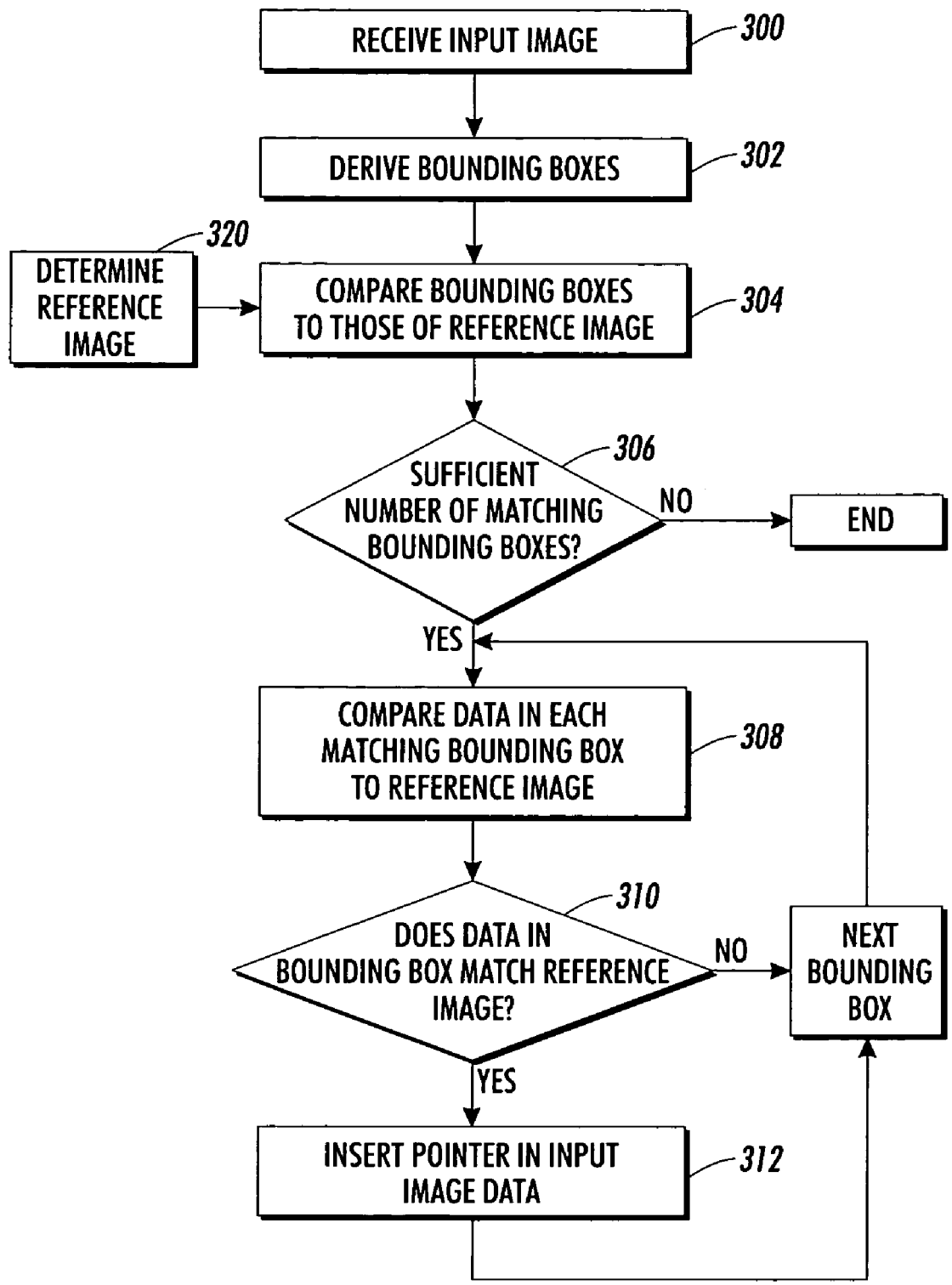
FIG. 3 is a simplified flowchart illustrating the basic steps by which two images can be compared.

FIG. 3 is a simplified flowchart illustrating the basic steps by which two images can be compared; in this embodiment, an "input image" is compared to a predetermined and preprocessed "reference image," but, as will be described in detail below, the "reference image" data can be obtained in various ways. At step 300, the data from the input image is received, such as through a digital input scanner as part of a digital copier, and suitably processed, such as by being segmented, analyzed, and converted to a known MRC or other format. As part of this analysis, a set of bounding boxes are determined around identified objects in the input image data through algorithms generally familiar in the art (step 302). The resulting bounding boxes and the objects therein are then compared to bounding box data related to the reference image (step 304). The bounding boxes are compared by attributes such as dimensions, location, image type (such as text, halftone image, photograph, etc.) and other features (such as color uniformity, black/white or color), which is a straightforward matter under many MRC image formats, as will be described in detail below.

If the number of matching (i.e., sufficiently similar) bounding boxes exceeds a threshold number (step 306), then it can reasonably be determined that the input image and the reference image share a common template, such as the images of FIG. 1 and FIG. 2. In a practical application, determining that two bounding boxes are "sufficiently similar" is a matter of selecting tolerances for box dimensions, location, type, feature, etc., that will take into account sources of image noise and distortion such as skew. Once this general similarity is determined by comparison of the bounding box data, the actual image data, or objects, within corresponding bounding boxes in the input and reference images are compared (step 308). If the data in the two boxes are sufficiently similar, taking into account tolerances for various types of noise and distortion (step 310), then it can be determined that the bounding box in question within the input image can be substituted with image data from the reference image; in such a case a pointer is placed within the input image data instead of image data directly describing the image in the bounding box (step 312). If a match is not determined, then the original input image data is used.

With regard to step 302 in detail, in one practical application, a multiple binary mask with multiple background window (MBM&MBW) model is useful for obtaining bounding box information. In MBM&MBW, the image is segmented into a background layer and a few binary mask layers. The binary mask layers represent text (and other details) of uniform color. In addition to a binary bitmap describing the text shapes, a binary layer also has information specifying the color of the texts and the location of the mask. The background layer represents anything that is not covered by the binary layers, including pictures and non-uniform text and other details. The background may be decomposed into several non-overlapping windows. If a window is uniform in color and has a simple shape, it may be specified with just a few parameters (a "uniform window"). More commonly, a window is associated with a color or grayscale bitmap, together with the information that specifies the location of the window. In a practical embodiment, the predictive coding is performed section by section for the input image, where a section could be a non-uniform background window, or a binary mask layer. Uniform background windows are typically excluded from analysis, as they typically contain only a small amount of bytes and prediction does not provide noticeable overall gain. However, if for some reason the prediction is desirable for the uniform windows, the procedure can be performed following the same principle as described for binary mask layers and background windows (or image objects).

With regard to steps 308 and 310 in detail, where the image data within corresponding bounding boxes are compared, the two bitmaps (images in bounding boxes to be compared) are first aligned. Specifically, the relative translations and rotations between the input and the reference bitmaps are estimated. The relative rotation is typically small and negligible, and can be estimated. The shift parameters can be derived using the results calculated from the steps of matching corresponding bounding boxes, or using any other standard methods. The input image bitmap is then divided into disjoint square blocks, with a typical block size of 16×16 to 64×64 pixels. The blocks are matched to the corresponding blocks in the reference image bitmaps. Many standard matching methods and error criteria can be used here. In one practical embodiment, the matching is performed at a lowered resolution, such as with sub-sampling for binary masks, and smoothing followed by sub-sampling for background windows. This not only reduces computation, but also enhances the robustness to noise for background windows. In addition to the global translations between the two bitmaps, each block might be shifted slightly differently; to compensate for the relative local shifts, the matching may be performed using several slightly different translation parameters. For each pair of corresponding bounding boxes, the matching is successful, i.e., the images are sufficiently similar, if the matching error is below a threshold. For each pair of corresponding images in the reference and input images, the compared images ("sections") are determined to be either "predictable" (identical within a certain tolerance) or unpredictable. A section of the input image that is unpredictable is coded normally, without prediction.

In a practical embodiment of step 312, where pointers are inserted into the input image data relating to the reference image data, for each pair of corresponding images in the reference and input images that are predictable. An instruction is set forth relating to how the prediction is conducted. The instruction includes a pointer to the reference section and a bounding box indicating which portion of the reference bitmap is used in prediction. The instruction also gives the relative position of the input bitmap and the reference bitmap; this information is required if some blocks failed in the steps 308, 310. As these blocks cannot be well predicted, the input information for these blocks need to be transmitted as "correction images."

The basic method set forth in FIG. 3 relates to a general case in which a recently-obtained "input image" is compared to a pre-existing "reference image." In a practical situation, such as in a digital copier or a network printing and copying system, the reference image must be somehow obtained in advance. Many approaches can be taken to obtain the reference image, or more broadly determine data describing a set of reference bounding boxes, as summarized at step 320 in FIG. 3. In a basic case, such as when a user of a digital copier is scanning in what is known to be set of slides with a uniform template, the user can indicate to the scanning system through a user interface that the first-scanned page image in the set should serve as the reference image in regard to subsequent page images in the set. A variation of this idea would be to have the user cause the scanning system to enter a special "training mode" in which a plurality of sheets believed to have a common "template" are scanned in and analyzed, basically by using an algorithm to find objects common to all of the sheets, taking into account certain types of noise such as skew and color variances (indeed, the detected variances in the training mode can be used to derive tolerances in the various matching steps). From this training mode a basic template of common objects can be derived, and this basic template can be used to determine the reference image data.

Figure 4:
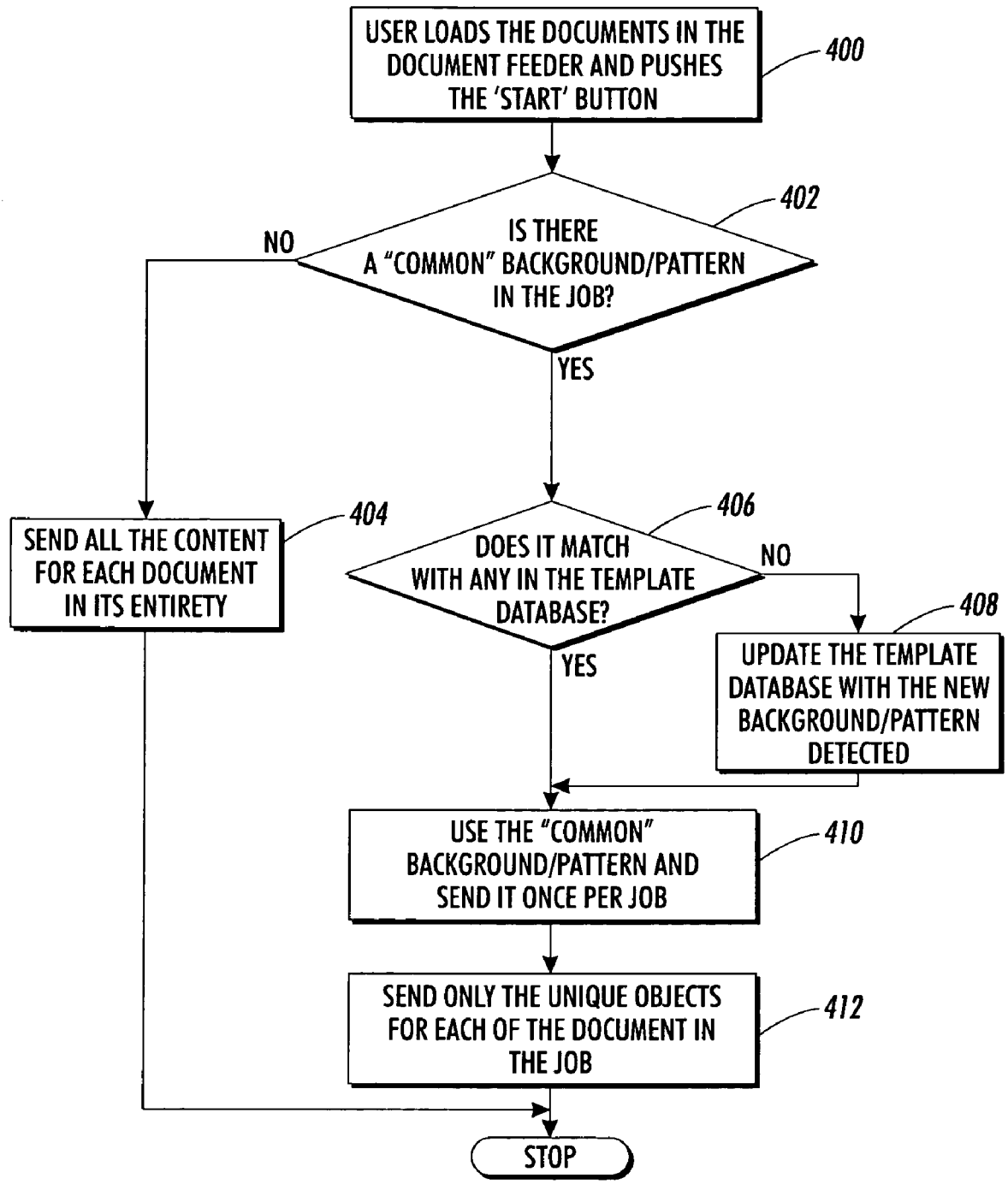
FIG. 4 shows a flow-chart for a method, which could be associated with a digital copier or scanner.

Another strategy for obtaining a suitable reference image includes maintaining a database of commonly-used image templates, which can be practical in the context of a large company with an established logo or style. A number of possible reference images are maintained in the database, and more can be added as desired or as detected by automatic software for such a purpose. FIG. 4 shows a flow-chart for a method, which could be associated with a digital copier or scanner, which exploits a database of possible reference images. At step 400, the original hard-copy documents are loaded and scanned. At step 402 the data based on the input page images is previewed, such as through low-resolution analysis, to find any recurring objects in the plurality of images. If no such recurring objects are found, the data is sent to downstream systems as a regular scan or copy job (step 404). If a recurring set of objects are found (step 402), the image data (which could be low-resolution data) is compared to each of a series of template images in the database. If the image data does not match any of the templates in the database (step 406), data related to the recurring image can be retained as a new template in the database (step 408). Then a the "best fit" template from the database can be used as the reference image, and the steps of FIG. 3 are followed; in which case the common aspects of the template image are used for every scanned page image (step 410) with only the data which varies among the page images sent in a normal manner to downstream systems (step 412). By using the database approach, the system can maintain a collection of templates for a given customer site and by averaging over a bigger sample, and the database will contain accurate representations of the templates.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of recording an input image as digital data, comprising:
   determining input bounding boxes corresponding to objects in the input image;
   comparing data describing the input bounding boxes to data describing a set of reference bounding boxes, the data describing the bounding boxes relating to at least one of image type, color, and color uniformity;
   for an input bounding box sufficiently similar to a reference bounding box, comparing objects in the input bounding box and the reference bounding box; and
   if the object in the input bounding box is sufficiently similar to the object in the reference bounding box, coding the object in the input bounding box using a pointer to the object in the reference bounding box.

2. The method of claim 1, the comparing data describing the input bounding boxes step including considering at least one dimension of the input bounding box.

3. The method of claim 1, the comparing data describing the input bounding boxes step including determining that a number of input bounding boxes sufficiently similar to a reference bounding box is greater than a predetermined threshold.

4. The method of claim 1, the comparing objects step including considering a plurality of blocks within the input image bounding box.

5. The method of claim 1, further comprising
   scanning a hard-copy image; and
   deriving data relating to the input image from the hard-copy image.

6. The method of claim 1, further comprising
   scanning a hard-copy image; and
   deriving data relating to the reference bounding boxes from the hard-copy image.

7. The method of claim 1, further comprising
   scanning a plurality of hard-copy images; and
   deriving data relating to the reference bounding boxes from the hard-copy images.

8. The method of claim 1, further comprising
   retaining data relating to a plurality of images in a database; and
   determining one of the plurality of images to be the reference image.

9. The method of claim 8, the determining step including performing a matching operation between one of the plurality of images and the input image.

* * * * *